Sept. 30, 1924.
R. D. HELLER
1,510,058
SCREENING DEVICE
Filed April 4, 1921
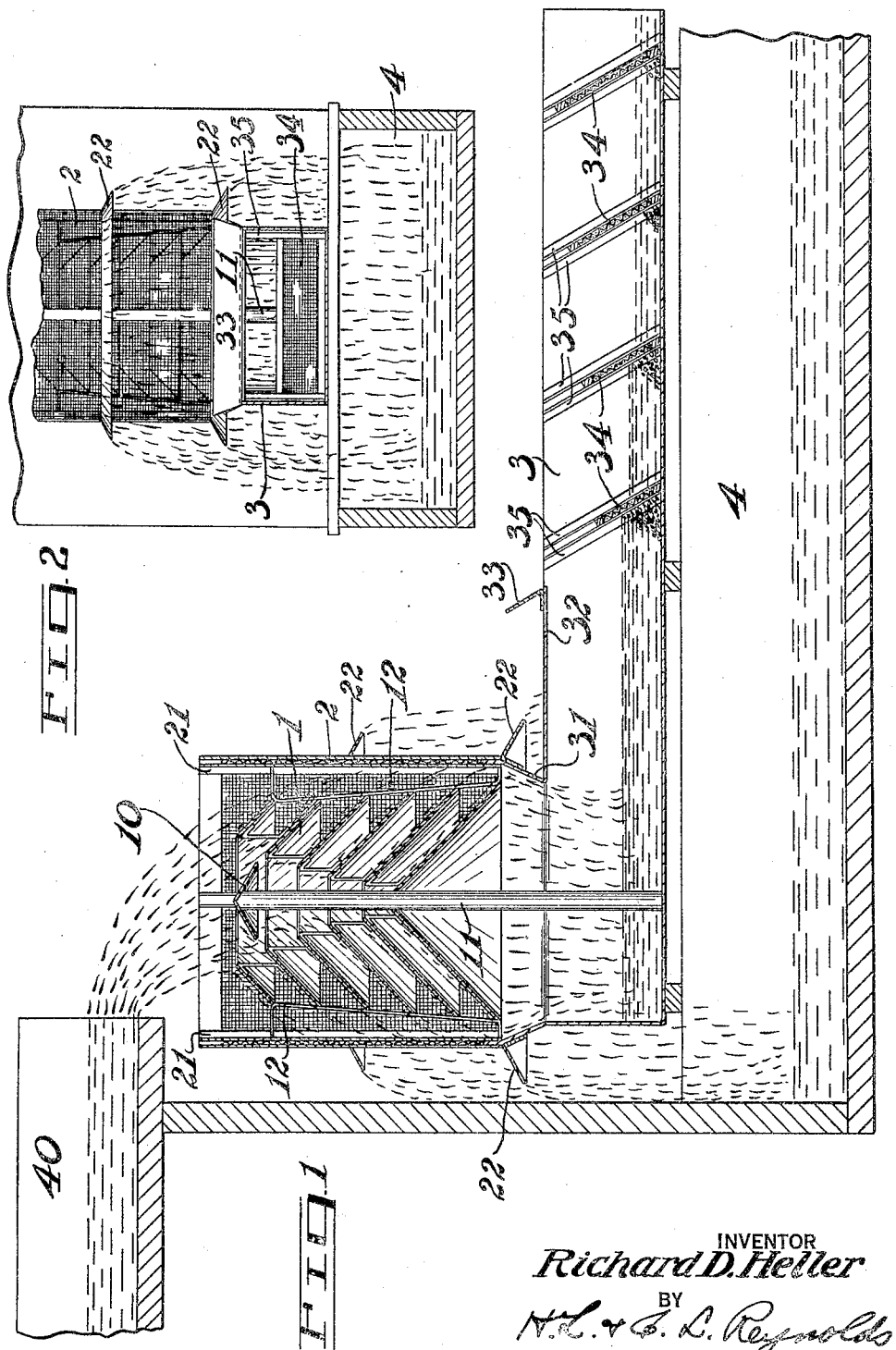
INVENTOR
*Richard D. Heller*
BY
*N.L. & S.L. Reynolds*
ATTORNEYS Patented Sept. 30, 1924.

1,510,058

UNITED STATES PATENT OFFICE.

RICHARD D. HELLER, OF BOISE, IDAHO.

SCREENING DEVICE.

Application filed April 4, 1921. Serial No. 458,374.

*To all whom it may concern:*

Be it known that I, RICHARD D. HELLER, a citizen of the United States of America, and resident of the city of Boise, in the county of Ada and State of Idaho, have invented certain new and useful Improvements in Screening Devices, of which the following is a specification.

My invention relates to screening devices which are particularly intended for removing the seeds and other like débris from the water flowing in irrigation ditches. The present application is an improvement upon my co-pending application Serial No. 382,189.

It is the principal object of my present invention to provide means constituting a largely increased screening capacity whereby a large amount of seeds and débris may be removed from the irrigation water without the necessity of constant attention and without the necessity of having to clean out the screen constantly.

Another object of my invention is to provide an improved screening device whereby the various classes of débris may be more conveniently removed.

Another object of my invention is to provide means employing primary and secondary screening elements, whereby considerable percentage of the water may be separated out by the primary screening mechanism, whereby the amount of water to be passed when removing the débris is largely reduced, thereby reducing the screen area needed.

My invention comprises those novel parts and combinations thereof which are shown in the accompanying drawings, described in the specification, and particularly defined by the claims terminating the same.

In the accompanying drawings I have shown my invention in the form which is now preferred by me.

Figure 1 is a longitudinal section through an irrigation ditch and flume and through my screening device.

Figure 2 is a transverse section through the flume and ditch, showing my device in elevation.

My previous invention consisted of only a single screening element which removed the débris from the water in a single operation and deposited the débris in a bucket or container which it was necessary to clean out at frequent intervals. The storage capacity for débris was only a portion of the volume of the screening bucket or container. By my present invention the primary screening element is employed only to remove a large portion of the water. The remainder is delivered, with the débris, into a secondary screening member which may be of greater or less capacity, as desired, and which will remove the débris and seeds, and which may be made of a capacity such that it needs but infrequent cleaning out. By this expedient the amount of water which must be passed through the débris-retaining screens is very much reduced, permitting an increased reduction in the area of screen needed to pass it.

The primary screening element may be similar to that shown in my co-pending application referred to above. It comprises a series of baffles 1 and 10 secured together upon the rod 11, and by means of the bars 12 connecting points in their peripheries, the whole being insertible in guides 21 of a screening bucket or container 2. The container 2 being made of screening material, and the baffles 1 and 10 being arranged to deflect water entering the container outward and through the mesh of the bucket 2, most of the water which enters the container will be eliminated through the sides of the container 2. Additional baffles 22 upon the outside of the bucket 2 serve to deflect the water which is running down the side of the bucket, in this manner to permit additional water to pass through the bucket. The particular form of the primary screening element is, however, largely immaterial, and that described is merely illustrative. The primary screening element, however, should be such as to eliminate a large portion of the water entering the container.

Beneath the container 2 is provided a flume 3 which receives the unscreened water which drops through the container 2 and its baffles 1. The container 2 may terminate at its lower end in a funnel 31 which connects with the flume and which directs the water from the container 2 into the flume. The flume adjacent the container 2 is preferably covered, as by a cover 32, upon which water screened through the bucket 2 may fall and from which it will drain, not into the flume 3 but into the ditch 4 below the flume. I may also provide a splash plate 33 upstanding from the cover 32 and located at a distance from the container 2. This splash plate prevents water overflowing from the cover 32 into the flume 3, and prevents water falling upon the cover from splashing over into the flume. This may be of any height desired.

In the flume 3 I provide secondary screening members which act upon the unscreened water which drops through the primary screen and which remove therefrom the débris and seeds. The secondary screening members which I have shown consists of screens 34 which extend transversely across the flume from one side to the other. These screens 34 are preferably sloped backward against the flow of water. They should stop sufficiently below the top of the flume to provide overflow capacity sufficient to carry the water when the screens become clogged. They may also be of progressive increasing height in the direction away from the primary screen. Thus the first of these screens 34 will remove the débris until it is banked up so that it has an insufficient carrying capacity; the water will then flow over this screen. The second screen then starts to remove the débris until it has been so clogged with débris that all the water will not flow therethrough. The same process continues for the third and fourth and so on for as many screens as may be provided. In this manner the débris storage capacity of the secondary screening member may be increased to any reasonable extent without increasing the size of the flume or the individual screens, and frequent cleaning of the screens is thus eliminated.

The screens 34 are supported in inclined guides 35 secured to the side walls of the flume 3. In this manner they may be removed for cleaning and again replaced. It may be desirable to provide the various screens 34 with varying size mesh. The first of these screens would then be of the largest mesh to remove the large débris, the next of somewhat finer mesh to remove finer débris, and so on. This, however, is not an essential part of my invention, but a refinement which may be desirable in certain cases.

The screening device in its entirety is positioned with the flume 3 supported above an irrigation ditch 4 so that it will finally deliver the screened water into the ditch. The primary screen is placed beneath the outlet of a ditch 40 and water from the ditch 40 is delivered directly into the container 2. There a large portion of the water is screened and drained into the ditch 4 as described above. The remainder, passing into the flume 3, is screened and the débris eliminated, whereupon the screened water falls into the ditch 4. At intervals the device may be cleaned by removing the screens 34 and collecting the débris gathered behind them.

By employing a series of screens spaced along a flume and of a height which will furnish sufficient flow capacity over their top when the screen becomes clogged by the screened material, a very much greater screening capacity is provided for a given size of flume. When the first flume becomes clogged, the second will begin functioning and when this becomes clogged the next will begin functioning.

What I claim as my invention is:

1. The combination with a primary self-cleaning screen for the elimination of a considerable percentage of the water, of a flow channel for receiving the unscreened water and the débris, having a series of screens adapted to be overflowed when clogged, and to successively function to retain the débris as the preceding screens of the series become clogged.

2. In a device of the character described, in combination, a primary water eliminating and débris-passing screen, a flume receiving the water not eliminated by the primary screen together with the débris, and a series of upright screens in said flume progressively increasing in height with their distance away from the primary screen.

3. In a device of the character described, in combination, a primary screen, a flume therebeneath to receive the water not eliminated by the primary screen together with the débris, means for preventing screened water falling into the flume, and secondary screening elements positioned in said flume to successively function as the preceding screens become clogged.

4. In a device of the character described, in combination, a primary screen, a flume receiving the water not eliminated by the primary screen, together with the débris, a cover for said flume adjacent the primary screen to prevent screened water falling into the flume, and secondary screening elements in said flume.

5. In a device of the character described, in combination, a primary screen, a flume therebeneath to receive the débris and the water not eliminated by the primary screen, a cover for said flume adjacent the primary screen to prevent screened water falling into the flume, a splash plate upstanding from said cover transversely thereof, and secondary screening elements in said flume.

6. In a device of the character described, in combination, a cylinder of screening material, baffles therein arranged to deflect water outwardly through the screening cylinder, a flume therebeneath, a funnel connecting said flume and the bottom of the cylinder, secondary screening elements in said flume, and means for preventing water screened through said cylinder from falling within said flume.

7. In a device of the character described, in combination, means for preliminarily screening out a large portion of the water while passing on the remainder of the water and the débris, a secondary screening mechanism receiving the unscreened water and the débris and containing means for catching and holding the débris and permitting the escape of the water.

Signed at Yakima, Yakima County, Washington, this 31 day of March, 1921.

RICHARD D. HELLER.